United States Patent [19]

Patterson et al.

[11] Patent Number: 4,590,474

[45] Date of Patent: May 20, 1986

[54] STREET CROSSING SIGNAL DEVICE FOR BLIND PERSONS

[76] Inventors: David G. Patterson, R.R. #6, Smiths Falls, Ontario; Albert W. Patterson, R.R. #5, London, Ontario, both of Canada

[21] Appl. No.: 476,490

[22] Filed: Mar. 18, 1983

[30] Foreign Application Priority Data

Mar. 25, 1982 [CA] Canada ................................. 399351

[51] Int. Cl.⁴ ............................................ G08G 1/095
[52] U.S. Cl. ..................................... 340/944; 340/925; 340/407
[58] Field of Search ........................ 340/925, 944, 407; 116/63, 205; 434/113; 135/DIG. 11; 256/59

[56] References Cited

U.S. PATENT DOCUMENTS 3,020,023  2/1962  MacIntyre et al. .................... 256/64

FOREIGN PATENT DOCUMENTS 2375672  8/1978  France ................................ 340/944

OTHER PUBLICATIONS

"Traffic Signals for the Blind", The American City, May 1979.

Primary Examiner—John W. Caldwell, Sr.
Assistant Examiner—Jeffery A. Brier
Attorney, Agent, or Firm—Burke-Robertson, Chadwick & Ritchie

[57] ABSTRACT

A street crossing signal device for blind pedestrians. The device indicates the directions of pedestrian crosswalks at an intersection, so that the blind person can orient himself in a desired direction for crossing the street at one of the crosswalks, and provides a signal to that person when that crosswalk is safe for pedestrian crossing. The device comprises a pair of rigid hand rails secured to a post at the corner of the intersection, each hand rail having at least a portion thereof oriented in the direction of a corresponding crosswalk. The device further comprises a vibrator means which is secured within each hand rail. The vibrator means when actuated causes its associated hand rail to vibrate. Also provided is means to mechanically isolate each hand rail from the post so that vibrations from the hand rails are not transmitted to the post. Electric circuit means associated with traffic control lights at the crossing are also provided, so that when the lights at the crosswalk are in a designation inviting pedestrian crossing, the vibration means for the particular hand rail having a portion oriented in the direction of that crosswalk is actuated.

5 Claims, 3 Drawing Figures

STREET CROSSING SIGNAL DEVICE FOR BLIND PERSONS

BACKGROUND OF THE INVENTION

This invention relates to a signal device for blind pedestrians to assist in the location of pedestrian crossings and to indicate to such persons when the way is clear to cross the street at such crossings.

There have been few aids developed to assist blind persons to locate pedestrian crosswalks and to indicate to such persons when the way is clear to cross streets. In some cases, pedestrian signal lights at pedestrian crossings are combined with a sound signal which can indicate to a blind person when the way is clear to cross. Such systems however do not really assist a blind person in locating precisely where the pedestrian crossing is, and, in the case of 4-way intersections, may cause some confusion as to which direction is clear for crossing.

It would be desirable to have a device which not only orients a blind person as to where a pedestrian crosswalk is located, but also can provide a non-visual and non-oral signal to that person which will indicate when the way is clear to cross a street. Such a device would be extremely useful to be included in the traffic signal systems at major intersections in urban areas or around centres for the visually handicapped. It is an object of the present invention to provide such a device.

SUMMARY OF THE INVENTION

According to the present invention a device is provided for use on a corner of an intersection of two streets for signalling to blind persons that it is safe to cross one of the streets of the intersection at a selected pedestrian crosswalk. The device comprises a pair of rigid hand rails. Each hand rail is secured to a post normally present at the corner, with the hand rail having at least a portion thereof oriented towards an associated crosswalk at the street intersection. The device further provides actuatable vibrator which is secured within a portion of each hand rail. The vibrator means, when actuated, causes its associated hand rail to vibrate. A mechanical means isolates each hand rail from the post so that vibrations of the selected hand rail are prevented from being transmitted to the post. Electronic circuit means are associated with the controls for lights at the street intersection and with the associated vibrator means, so that the vibrator means of the hand rail that has a portion oriented towards an associated crosswalk is actuated when the lights permit crossing the street at that crosswalk. A blind person, in approaching an intersection or pedestrian crosswalk where such a device has been installed, by gripping a hand rail, oriented in the direction he wishes to pass, is immediately able to orient himself as to the precise direction in which the pedestrian crosswalk is located, and, by awaiting the vibration of the hand rail, is given a tactile signal when the way is clear to cross the street.

BRIEF DESCRIPTION OF THE DRAWINGS

These and other objects and advantages of the present invention will become apparent upon reading the following detailed description and upon referring to the drawings in which.

Figure 1:
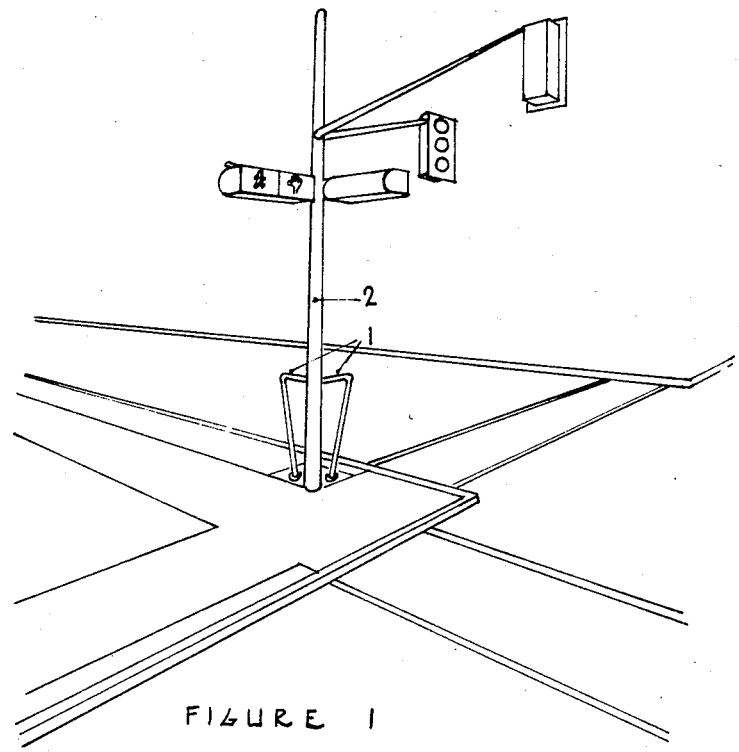
FIG. 1 is a perspective view of an intersection in which a signal device according to the present invention has been installed.

While the invention will be described in connection with an example embodiment, it will be understood that it is not intended to limit the invention to such embodiments. On the contrary, it is intended to cover all alternatives, modifications and equivalents as may be included within the spirit and scope of the invention as defined by the appended claims.

DETAILED DESCRIPTION OF THE DRAWINGS

In the following description, similar features have been given similar reference numerals.

Figure 2:
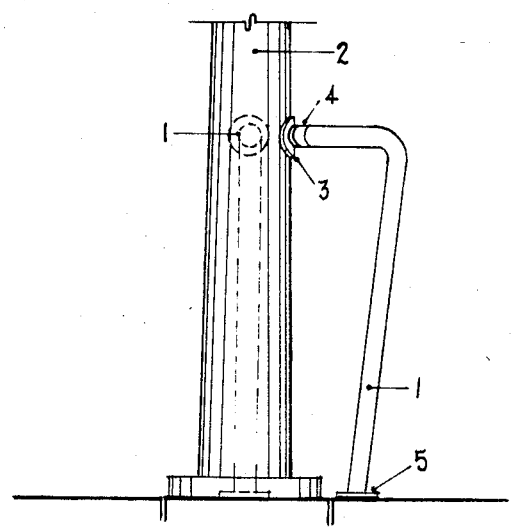
FIG. 2 is a side view of a post and signal device according to FIG. 1.
Figure 3:
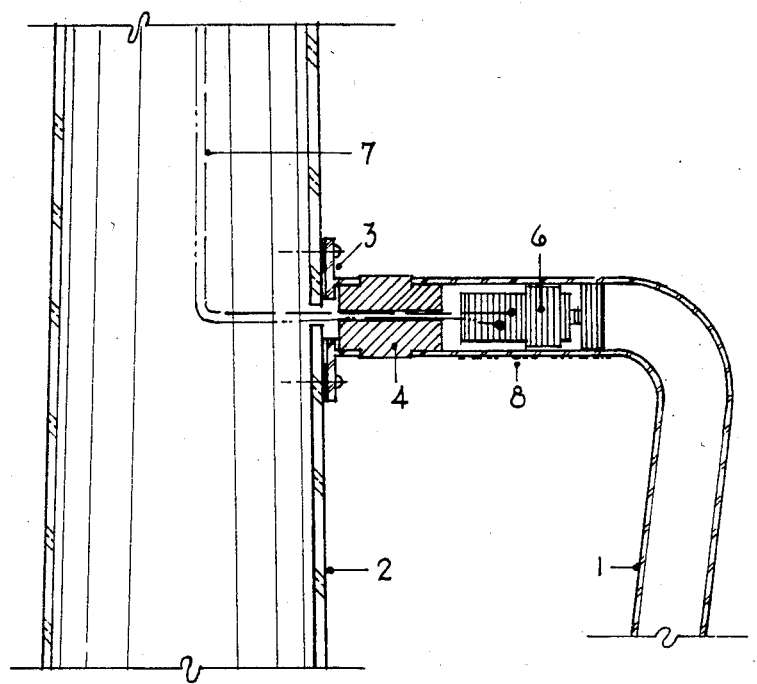
FIG. 3 is an enlarged side section view of a portion of the post and signal device of FIG. 2.

Turning to FIG. 1 there is shown a sidewalk/street intersection in which a pair of street crossing signal devices 1 according to the present invention have been installed on traffic and pedestrian signal light post 2. The device comprises a hand rail having an upper, horizontal section secured to the post at clamp 3, this upper section being oriented in the direction of the appropriate pedestrian crossing, and which curves into a lower, vertical section the bottom of which is secured by clamp 5 to the ground or sidewalk. As can be seen in FIG. 2 the vertical section is inwardly angled towards the post as it extends downwardly from the upper section to the ground. As can be seen in FIGS. 2 and 3, the hand rail portion of the device is mechanically isolated from post 2 and clamp 3 by means of an elastomeric plug 4. An appropriate electronically actuated vibrator 6 is fitted within the tubing of the hand rail (FIG. 3) such that, when actuated, the hand rail part of device 1 vibrates, the vibrations from which are not transmitted to post 2 in view of plug 4. Vibrator 6 is electrically connected through circuitry 7 to the circuitry operating the pedestrian crossing lights signalling pedestrians to cross or stop in the pedestrian crossing to which that particular hand rail is oriented, in such a way that when that pedestrian crossing light operates to invite pedestrians to cross in that particular direction, vibrator 6 is actuated. Similarly, when those pedestrian crossing lights are in a designation indicating that pedestrians should not cross, vibrator 6 is inactive.

It will be understood from the above description that the elastomeric plug 4 is important to ensure that, where more than one signal device 1 is attached to a post 2, vibrations from one of the hand rails are not transmitted through the post to the other hand rail.

As can be seen in FIG. 3, appropriate braille symbols 8 may be inscribed beneath the upper horizontal portion of the hand rail of device 1 to provide information to a blind person as to proper use of the device.

Where there is no signal post 2 located at an intersection or if an existing signal post is inappropriately located, signal device 1 may of course be free standing and wired in an appropriate fashion to a traffic signal light, pedestrian light or timer mechanism located at such a site.

A blind person, arriving at the intersection shown in FIG. 1, and desiring to cross in either of the two pedestrian crosswalks, simply places his hand on or about the upper, horizontal portion of signal device 1, and waits for it to commence vibrating. When vibrations commence, he may then proceed in the direction indicated by that upper horizontal portion safely across the pedestrian crosswalk.

Thus it is apparent that there has been provided in accordance with the present invention a street crossing signal device for blind persons that fully satisfies the objects, aims and advantages set forth above. While the invention has been described in conjunction with a specific embodiment thereof, it is evident that many alternatives, modifications and variations will be apparent to those skilled in the art in light of the foregoing description. Accordingly, it is intended to embrace all such alternatives, modifications and variations as fall within the spirit and broad scope of the appended claims.

What we claim as our invention:

1. A device for use on a post such as is normally present at a corner of an intersection of two streets for signalling to blind persons that it is safe to cross one of the streets of the intersection at a selected pedestrian crosswalk, two such crosswalks originating from that corner, the device comprising:

(a) two rigid hand rails, each said hand rail being secured to the post and having at least a portion oriented towards an associated said crosswalk at said street intersection;

(b) an actuatable vibrator means secured within a portion of each said hand rail, said vibrator means, when actuated, causing its associated said hand rail to vibrate;

(c) mechanical means isolating each said hand rail from said post so that vibrations of each selected said hand rail are prevented from being transmitted to said post; and (d) electronic circuit means associated with controls for pedestrian crossing lights at said street intersection and with associated said vibrator means, so that the vibrator means of the hand rail that has a portion oriented towards an associated said crosswalk is actuated when said pedestrian crossing lights permit crossing the street at that crosswalk.

2. A signal device according to claim 1 wherein the hand rail comprises an upper, horizontal section one end of which is to be secured to the post, this section being oriented towards the pedestrian crosswalk, the upper horizontal section curving into a lower, vertical section secured to a base common with the post.

3. A signal device according to claim 1 wherein the vibrator means is fitted within a tubular section of the hand rail.

4. A signal device according to claim 2 wherein the vertical section is inwardly angled towards the post as it extends downwardly from the upper section to the bottom.

5. A signal device according to claim 1 wherein the mechanical means comprises an elastomeric joint between the post and the hand rail.

* * * * *